US008875200B2

(12) United States Patent
Park

(10) Patent No.: US 8,875,200 B2
(45) Date of Patent: Oct. 28, 2014

(54) METHOD AND APPARATUS FOR OUTPUTTING VIDEO FRAMES WHILE CHANGING CHANNELS WITH DIGITAL BROADCAST RECEIVER

(75) Inventor: Min-Kyu Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1227 days.

(21) Appl. No.: 12/016,426

(22) Filed: Jan. 18, 2008

(65) Prior Publication Data

US 2009/0015725 A1 Jan. 15, 2009

(30) Foreign Application Priority Data

Jul. 10, 2007 (KR) ........................ 10-2007-0069190

(51) Int. Cl.
*H04N 5/50* (2006.01)
*H04N 21/438* (2011.01)
*H04N 21/426* (2011.01)

(52) U.S. Cl.
CPC ............. *H04N 5/50* (2013.01); *H04N 21/4384* (2013.01); *H04N 21/4263* (2013.01)
USPC ............. 725/90; 348/607; 348/620; 348/731; 375/240.27

(58) Field of Classification Search
CPC .......... H04N 21/4384; H04N 21/4305; H04N 21/2368; H04N 21/4307; H04N 21/4341; H04N 5/50
USPC ........ 348/731, 607, 620; 375/240.27, 240.12, 375/240.13; 725/90–93
See application file for complete search history.

(56) References Cited

U.S. PATENT DOCUMENTS

| | | | | |
|---|---|---|---|---|
| 6,115,080 | A * | 9/2000 | Reitmeier | 348/731 |
| 6,591,013 | B1 * | 7/2003 | Taunton | 382/233 |
| 6,683,988 | B1 * | 1/2004 | Fukunaga et al. | 382/236 |
| 2003/0190144 | A1 * | 10/2003 | Kuno et al. | 386/68 |
| 2005/0207449 | A1 * | 9/2005 | Zhang et al. | 370/486 |
| 2006/0013318 | A1 * | 1/2006 | Webb et al. | 375/240.25 |
| 2007/0073779 | A1 * | 3/2007 | Walker et al. | 707/104.1 |
| 2007/0183496 | A1 * | 8/2007 | Kadono et al. | 375/240.08 |

FOREIGN PATENT DOCUMENTS

| | | | |
|---|---|---|---|
| JP | 2003116073 | A | 4/2003 |
| JP | 2004-80785 | A | 3/2004 |
| KR | 10-2006-0019302 | A | 3/2006 |
| KR | 10-2006-0097478 | A | 9/2006 |
| KR | 10-2006-0122331 | A | 11/2006 |
| KR | 1020070027780 | A | 3/2007 |

OTHER PUBLICATIONS

Communication dated Jul. 26, 2013 issued by the Korean Intellectual Property Office in counterpart Application No. 10-2007-0069190.

* cited by examiner

*Primary Examiner* — Brian T Pendleton
*Assistant Examiner* — Alan Luong
(74) *Attorney, Agent, or Firm* — Sughrue Mion, PLLC

(57) ABSTRACT

A method and apparatus for outputting video frames while changing channels using a digital broadcast receiver are provided. The method includes sequentially tuning to a plurality of channels and receiving a plurality of digital broadcast signals from the respective channels; extracting a plurality of video frames from the respective digital broadcast signals and storing the video frames; receiving a digital broadcast signal from a desired channel to be tuned upon receiving a channel-change command; and outputting at least one of the stored video frames before a digital broadcast signal of the desired channel is output.

16 Claims, 8 Drawing Sheets

METHOD AND APPARATUS FOR OUTPUTTING VIDEO FRAMES WHILE CHANGING CHANNELS WITH DIGITAL BROADCAST RECEIVER

CROSS-REFERENCE TO RELATED APPLICATION

This application claims priority from Korean Patent Application No. 10-2007-0069190 filed on Jul. 10, 2007 in the Korean Intellectual Property Office, the disclosure of which is incorporated herein by reference in its entirety.

BACKGROUND OF THE INVENTION

1. Field of the Invention

Methods and apparatuses consistent with the present invention relate to digital broadcast reception, and more particularly, to outputting video frames while changing channels using a digital broadcast receiver, in which channel-changing latency that may occur when changing channels using a digital broadcast receiver can be reduced.

2. Description of the Related Art

Digital broadcast receivers restore digital data from broadcast signals which are transmitted thereto using a digital transmission method. Digital broadcast transmitters such as broadcasting stations (hereinafter referred to as "head-ends") convert analog signals into digital signals having logic values of 0 and 1, compress the digital signals along with additional information, and transmit the compressed digital signals using a digital transmission method. Then, digital broadcast receivers restore original video and audio signals from compressed digital signals transmitted by digital broadcast transmitters.

Digital technology is more robust against noise, consumes less power, and results in less degradation of data-regardless of transmission, copy, and accumulation operations than analog technology. In addition, digital technology, unlike analog technology, can employ an error-concealment technique. Moreover, digital technology contributes the compression of wideband video and audio signals, and the facilitation of data searches, data processing, and data-editing operations. Thus, digital broadcasting can provide various advantages over analog broadcasting by realizing robust, highly-efficient data transmission methods.

Digital broadcasting has enabled the delivery of audio/video data to the homes of viewers with little or no data loss. Also, digital broadcasting has enabled the transmission of various additional information, and has thus enabled viewers to enjoy various broadcast content. For example, it is possible to enhance the viewing experience when the viewer watches, for example, a sports game, by providing the viewer with information regarding players of the sports game in real time.

However, the speed of changing channels using a digital broadcast receiver is much lower than the speed of changing channels with an analog broadcast receiver. In the case of analog broadcasting, a channel corresponds to a broadcasting station, and, thus, a broadcast station can be identified by a corresponding channel number. In contrast, in the case of digital broadcasting, a channel corresponds to a broadcast program, i.e., an audio/video stream or an additional data service stream, and, thus, a channel number denotes a program identifier (PID).

Changing digital broadcast channels is generally carried out by searching for a PID of a channel that a user wishes to tune to. Since PIDs continuously vary according to the circumstances of broadcasting stations or broadcast programs, and the search of PIDs often results in latency, the speed of changing digital broadcast channels is generally lower than the speed of changing analog broadcast channels.

In order to address this, a method which involves receiving a plurality of transport streams (TSs) from respective corresponding channels using a plurality of tuners has been suggested, decoding one of the TSs originating from a channel to be displayed as a packetized elementary stream (PES), dividing the PES into a video elementary stream (ES) and an audio ES, and decoding the video ES and the audio ES separately, and outputting the decoded video ES and the decoded audio ES has been suggested. According to this conventional method, a TS of a channel adjacent to the channel to be displayed is decoded as a PES, but is not output. When a user changes the channel to a channel adjacent to the channel to be displayed, a PES of the adjacent channel is divided into a video ES and an audio ES, the video ES and the audio ES are decoded separately, and the decoded video ES and the decoded video ES are output.

This conventional method, however, requires the installation of as many tuners as there are TSs. If there are fewer tuners than TSs, a PES discontinuity may occur. If a decoding operation is performed when a PES discontinuity is present, a frame error or degradation may occur.

Also, the conventional method only takes into consideration changing the channel to either a channel directly above or below a channel currently being watched by a user, and thus may not be able to appropriately respond to various user demands regarding changing channels.

SUMMARY OF THE INVENTION

The present invention provide a method and apparatus for outputting video frames while changing channels using a digital broadcast receiver, in which channel-changing latency that may occur when changing channels using a digital broadcast receiver can be reduced.

According to an aspect of the present invention, there is provided a method of outputting video frames while changing channels using a digital broadcast receiver, the method including: sequentially tuning to a plurality of channels and receiving a plurality of digital broadcast signals from the respective channels; extracting a plurality of video frames from the respective digital broadcast signals and storing the video frames; receiving a digital broadcast signal from a desired channel that a user wishes to tune to upon receiving a channel change command from the user; and outputting at least one of the stored video frames before a digital broadcast signal of the desired channel is output to the user.

According to another aspect of the present invention, there is provided an apparatus for outputting video frames while changing channels using a digital broadcast receiver, the apparatus including: a main tuner which receives a digital broadcast signal from a desired channel that a user wishes to tune to; one or more auxiliary tuners which sequentially tune to a plurality of channels and receive a plurality of digital broadcast signals from the respective channels; a storage module which stores a plurality of video frames extracted from the respective digital broadcast signals; and a control module which controls the main tuner to receive the digital broadcast signal of the desired channel upon receiving a channel change command from the user, and outputs at least one of the video frames present in the storage module before the digital broadcast signal of the desired channel is output to the user.

BRIEF DESCRIPTION OF THE DRAWINGS

The above and other aspects of the present invention will become apparent by describing in detail exemplary embodiments thereof with reference to the accompanying drawings, in which.

DETAILED DESCRIPTION OF EXEMPLARY EMBODIMENTS OF THE INVENTION

Figure 1:
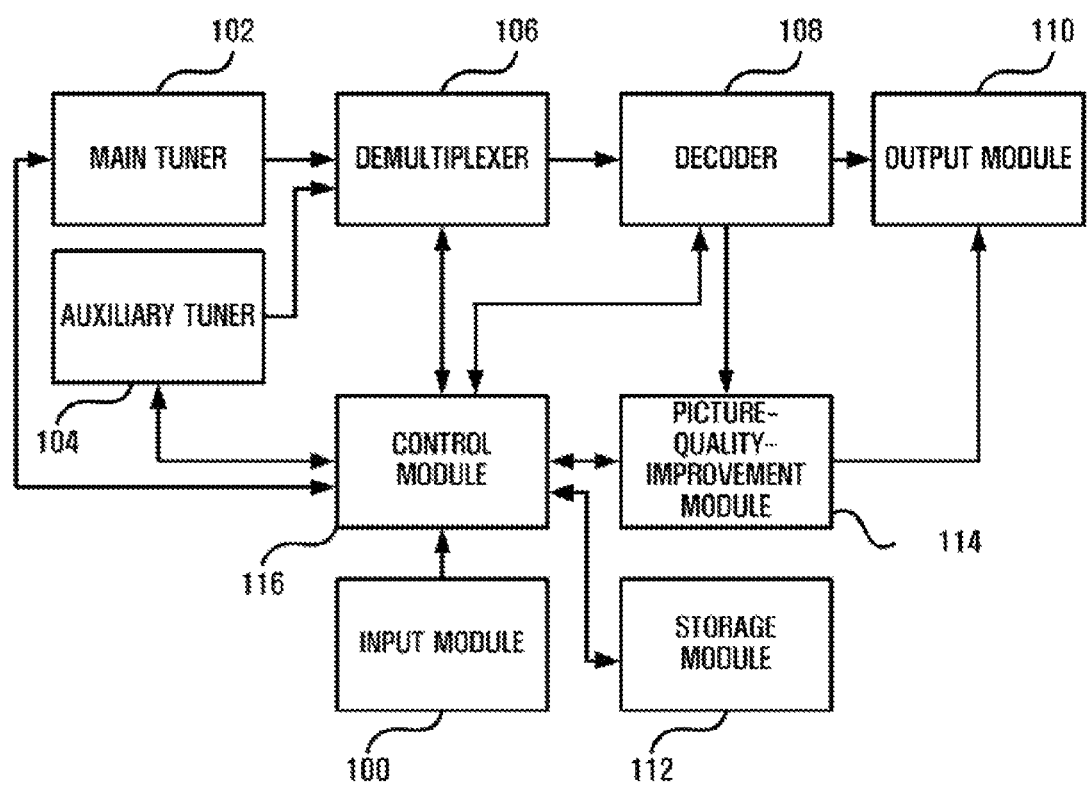
FIG. 1 is a block diagram of an apparatus for outputting video frames while changing channels using a digital broadcast receiver, according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

FIG. 1 is a block diagram of an apparatus for outputting video frames while changing channels using a digital broadcast receiver, according to an exemplary embodiment of the present invention. Referring to FIG. 1, the apparatus includes an input module 100, a main tuner 102, an auxiliary tuner 104, a signal-processing module (not shown), an output module 110, a storage module 112, a picture-quality-improvement module 114, and a control module 116.

The input module 100 may include a function button or a remote control of a digital broadcast receiver, and may thus enable a user to input various commands to change channels, turn on/off the digital broadcast receiver, or increase/decrease the volume of sound. However, the present invention is not restricted to this. That is, the input module 100 may include a jog dial or a touch screen. The user may input various operation commands respectively corresponding to various functions to the input module 100.

A tuner tunes to a channel and receives a digital broadcast signal from the channel. A digital broadcast signal may be transmitted or received as a transport stream (TS) in MPEG-2 format. The format of a TS is as specified by the MPEG-2 broadcast-related standard, and, thus, a detailed description of the format of a TS has been skipped.

The main tuner 102 tunes to a channel set in advance as a default channel or a channel desired by the user and receives a digital broadcast signal from the default channel or from the desired channel.

The auxiliary tuner 104 sequentially tunes to a plurality of channels and receives a digital broadcast signal from each of the channels. Specifically, the auxiliary tuner 104 may tune to the channels according to the priorities among the channels. Although a single auxiliary tuner is illustrated in FIG. 1, the apparatus may include a plurality of auxiliary tuners.

The signal-processing module may include a demultiplexer 106 which separates and extracts a video frame from a digital broadcast signal received by the main tuner 102 or the auxiliary tuner 104; and a decoder 108 which decodes the video frame provided by the demultiplexer 106 and thus restores an image. The signal-processing module may separate an audio signal from a digital broadcast signal received by the main tuner 102 or the auxiliary tuner 104, and process the audio signal. However, in the present exemplary embodiment, the signal-processing module extracts a video frame from a digital broadcast signal received by the main tuner 102 or the auxiliary tuner 104, and processes the video frame. The signal-processing module may include a plurality of hardware decoders. For example, a picture-in-picture (PIP) television (TV) may include two hardware decoders. Alternatively, the signal-processing module may include a plurality of software decoders. As another alternative, the signal-processing module may use a single decoder to decode a plurality of video frames respectively corresponding to a plurality of channels.

The demultiplexer 106 obtains a packetized elementary stream (PES) from a TS by parsing the TS. Then, the demultiplexer 106 obtains an ES by parsing the PES, and outputs the ES. That is, the demultiplexer 106 outputs a video frame as an ES, and the decoder 108 decodes the ES output by the demultiplexer 106.

The output module 110 may include a display device such as a cathode ray tube (CRT), a plasma display panel (PDP), or a liquid crystal display (LCD) which outputs a restored image provided by the decoder 108.

The storage module 112 stores channel priority information regarding priorities of the plurality of channels. Also, the storage module 112 stores one or more video frames which are extracted from respective digital broadcast signals received by the auxiliary tuner 104. The video frames present in the storage module 112 have no error or degradation from a decoder's point of view, and can thus be readily decoded and output by the decoder 108. When one or more video frames are stored in the storage module 112, intra-frame (I-frame) is stored first. The video frames present in the storage module 112 may include I-frames only or may include a plurality of frames including an I-frame and predicted frames (P-frames) and/or bi-directional frames (B-frames) that follow the I-frame. I-frames, P-frames, and B-frames are described later in detail. The video frames present in the storage module 112 may include PES or ES data obtained from a number of digital broadcast signals received by the auxiliary tuner 104. Alternatively, the video frames present in the storage module 112 may include video frames which have already been processed by the demultiplexer 106 and the decoder 106, and may thus be able to be output. The storage module 112 may include at least one of a nonvolatile memory device such as a cache, a read only memory (ROM), a programmable ROM (PROM), an erasable PROM (EPROM), an electrically EPROM (EEPROM), or a flash memory; a volatile memory device such as a random access memory (RAM); and a storage medium such as a hard disc drive (HDD), but the present invention is not restricted to those set forth herein.

Priorities of the plurality of channels may be determined in two different manners. First, priorities of the plurality of channels may be determined in consideration of a group of pictures (GOP). Second, priorities of the plurality of channels may be determined according to the channels' probabilities of being chosen by a user.

A GOP may include I-frames, P-frames and B-frames.

I-frames are reference frames from which B and P-frames are predicted, and contain all the information to make up a single complete frame. Therefore, I-frames can be decoded without reference to other frames.

P-frames contain motion information regarding the differences with previous I-frames.

B-frames contain motion information regarding the differences with previous I-frames and P-frames and with subsequent I-frames and P-frames.

Therefore, P-frames are decoded with reference to I-frames, and B-frames are decoded with reference to I-frames and P-frames that are temporally previous to or subsequent to the B-frames.

I-frames, P-frames, and B-frames may be arranged in the order of I, B, B, P, B, B, P, B, B, P, B, B, I, B, B, P, . . . . That is, a number of P-frames may be inserted between a pair of adjacent I-frames, and a number of B-frames may be inserted between an I-frame and a P-frame. A GOP may comprise a current I-frame and a number of P and B-frames inserted before a subsequent I-frame. The size of a GOP may be determined by the number of I, P, and B-frames present in the GOP.

Priorities of the plurality of channels may be determined according to the order of receiving an I-frame. For example, assume that the time axis begins at a time of 0 s, that a sixth channel receives an I-frame every second, e.g., at times of 0, 1, 2, 3 s, . . . , that a seventh channel receives an I-frame every second, e.g., at times of 0.5, 1.5, 2.5, 3.5 s, . . . , and that a plurality of frames present in a GOP are evenly spaced. In this situation, assuming that an arbitrary auxiliary tuner tunes a subsequent channel to obtain the video frames at times of 1.7 s, the arbitrary auxiliary tuner may have to wait for 0.3 s to obtain an I-frame from the sixth channel and 0.8 s to obtain an I-frame from the seventh channel. Since a GOP generally begins with an I-frame, the arbitrary auxiliary tuner may decide to tune to the sixth channel in anticipation of less latency because of the need to tune to other channels afterwards. In this case, the sixth channel may be set to have a higher priority than the seventh channel.

Alternatively, priorities among channels may be determined according to their probabilities of being chosen by a user. For example, a channel that is adjacent to a channel currently being chosen by a user (such as a channel directly above or below the current channel) or a previous channel may have a high priority. As another alternative, priorities among channels may be determined according to preferred channel information regarding channels preferred by a user, or according to preferred content information specifying channels (e.g., a drama channel) that provide content preferred by a user.

The picture-quality-improvement module 114 may include a filter for improving the quality of pictures. Specifically, the picture-quality-improvement module 114 may include a deblocking filter which can reduce the loss of blocks of video frames, but the present invention is not restricted to this.

The control module 116 updates and manages channel priority information present in the storage module 112. In general, the number of channels is greater than the availability of resources such as tuners, and it is expected that the number of channels will further increase. Given these circumstances, it is inefficient to store the video frames obtained from all available channels using a limited number of auxiliary tuners 104. Rather, it is more efficient to obtain video frames from only some channels which are highly likely to be chosen by a user, to store the obtained video frames, and to quickly output the stored video frames in response to a channel change request issued by the user while tuning to a channel and processing a digital broadcast signal received from the channel.

For example, the control module 116 may automatically update the channel priority information by storing channel numbers respectively corresponding to channels which have been received within a predetermined period of time, determining the frequency of use of each of the channels, and automatically setting one or more channels whose frequency of use exceeds a predefined level as preferred channels.

The control module 116 controls the auxiliary tuner 104 to sequentially tune to a plurality of channels according to the channel priority information present in the storage module 112 and to receive a plurality of digital broadcast signals from the respective channels. Then, the control module 116 controls the demultiplexer 106 to separate and extract a plurality of video frames from the respective digital broadcast signals obtained by the auxiliary tuner 104. The control module 116 determines whether the video frames obtained by the demultiplexer 106 are good enough to be stored in the storage module 112. For example, the control module 116 may determine whether the video frames obtained by the demultiplexer 106 have no error or degradation. If the video frames obtained by the demultiplexer 106 are determined not to be good enough to be stored in the storage module 112, the control module 116 controls the auxiliary tuner 104 to continue to receive a plurality of digital broadcast signals from the respective channels until proper video frames are obtained. In contrast, if the video frames obtained by the demultiplexer 106 are determined to be good enough to be stored in the storage module 112, the control module 116 stores the video frames obtained by the demultiplexer 106 in the storage module 112.

The control module 116 may update the channel priority information present in the storage module 112 so that a next highest-priority channel can become a new highest-priority channel. Then, the control module 116 may control the auxiliary tuners 104 to sequentially tune to the channels according to the updated channel priority information.

When a channel change command is received from the user via the input module 110, the control module 116 controls the main tuner 102 to receive a digital broadcast signal from a desired channel selected by the user. The digital broadcast signal received by the main tuner 102 is processed by the signal-processing module, and the processed digital broadcast signal is output by the output module 110. A delay may occur between the reception of a digital broadcast signal from a desired channel by the main tuner 102 and the output of video frames of the desired channel by the output module 110. In order to address this, the control module 116 may output one or more video frames present in the storage module 112 to the output module 110 during such a delay. For this, the control module 116 controls the decoder 108 to decode one or more video frames present in the storage module 112. Then, the decoded video frames are output to the output module 110. Therefore, it is possible to reduce the inconvenience associated with a delay in the output of a video frame of the desired channel.

The control module 116 may adjust the output timing of the decoded video frames. In general, video frames of a broadcast program are output at a rate of 30 frames per second (fps). If there are only three video frames present in the storage module 112, and the three video frames are output without any consideration of the length of a delay in the output of video frames of the desired channel, no video frames may be output any longer after the output of the three video frames present in the storage module 112, and video frames of the desired channel may be output at a rate of 30 fps. The control module 116 may adjust the number of frames to be output per unit time in consideration of the length of a delay in the output of video frames of the desired channel and output one or more video frames present in the storage module 112 according to the result of the adjustment, thereby enabling natural frame transitions.

The control module 116 determines whether a video frame separated from a digital broadcast signal received by the main tuner 102 is an intra-frame or an inter-frame.

Intra-frames can be decoded without reference to other frames, whereas inter-frames cannot be decoded without reference to other frames. According to the MPEG standard, I-frames are intra-frames, and P and B-frames are inter-frames.

If a video frame separated from a digital broadcast signal received by the main tuner 102 is an intra-frame, the control module 116 controls the decoder 108 to decode the intra-frame and to output the decoded intra-frame to the output module 110.

In contrast, if the video frame separated from the digital broadcast signal received by the main tuner 102 is an inter-frame, the control module 116 designates at least one frame present in the storage module 112 as a reference frame of the inter-frame, and controls the decoder 108 to decode the inter-frame using the frame designated as the reference frame of the inter-frame.

The decoding of an inter-frame using a frame present in the storage module 112 as a reference frame of the inter-frame may result in a frame error or degradation. In order to address this, the control module 116 may use an error-concealment method.

Specifically, the control module 116 may use an extrapolation method to perform error concealment, especially when an entire inter-frame is damaged. As inter-frame continuity increases and motion vector information increases, error concealment may be very effective for video frames with a high continuity there between and with a considerable amount of motion vector information.

The control module 116 determines the degree of picture quality degradation caused by error concealment (e.g., blocking artifacts). If the degree of picture quality degradation caused by error concealment is higher than a predefined reference level, the control module 116 may skip the video frame. In contrast, if the degree of picture quality degradation caused by error concealment is lower than the predefined reference level, the control module may output the video frame to the output module 110. The control module 116 may provide an error-concealed video frame to the picture-quality-improvement module 114 before outputting the error-concealed video frame to the output module 110. Alternatively, the control module 116 may control the picture-quality-improvement module 114 to improve the picture quality of an error-concealed video frame, and may then determine whether to skip the error-concealed video frame based on the degree of degradation of the picture quality of the error-concealed video frame.

Figure 2:
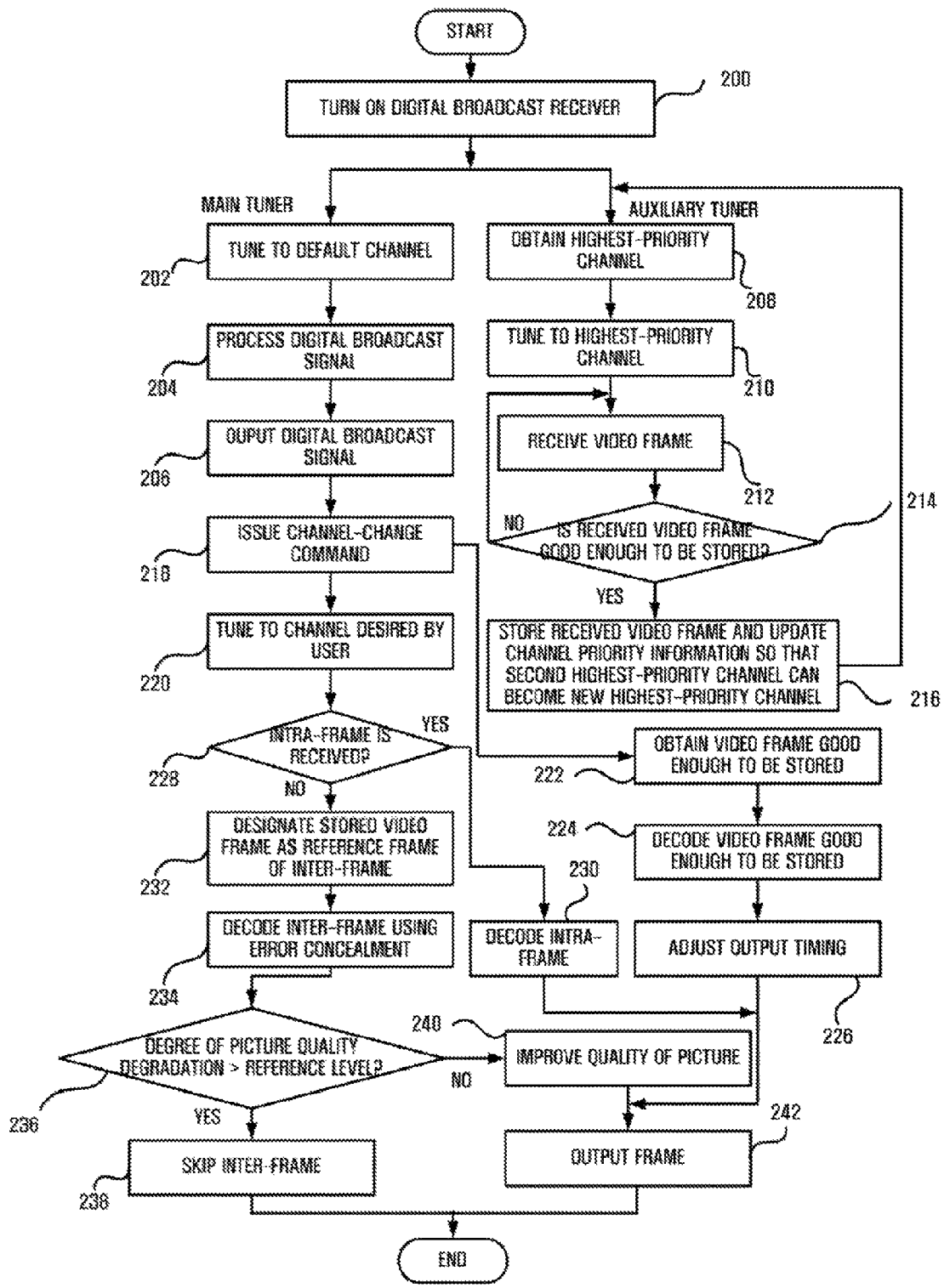
FIG. 2 is a flowchart illustrating a method of outputting video frames while changing channels using a digital broadcast receiver, according to an exemplary embodiment of the present invention.

FIG. 2 is a flowchart illustrating a method of outputting video frames while changing channels using a digital broadcast receiver, according to an exemplary embodiment of the present invention. Referring to FIG. 2, when the digital broadcast receiver of FIG. 1 is turned on (200), the main tuner 102 tunes to a channel set in advance as a default channel, and receives a digital broadcast signal from the channel (202). The signal-processing module processes the digital broadcast signal (204), and outputs the processed digital broadcast signal to the output module 110 (206).

The control module 116 obtains information regarding a highest priority channel from channel priority information present in the storage module 112 and provides the information to the auxiliary tuner 104 (208). Then, the auxiliary tuner 104 tunes to the highest priority channel and receives a digital broadcast signal from the highest priority channel (210).

The control module 116 controls the demultiplexer 106 to separate a video frame from the digital broadcast signal received from the highest priority channel (212).

Thereafter, the control module 116 determines whether the video frame obtained in operation 212 is good enough to be stored in the storage module 112 (214). If the video frame obtained in operation 212 is determined not to be good enough to be stored in the storage module 112, the control module 116 controls the auxiliary tuner 104 to continue to receive a digital broadcast signal from the highest priority channel. In contrast, if the video frame obtained in operation 212 is determined to be good enough to be stored in the storage module 112, the control module 116 stores the video frame obtained in operation 212 in the storage module 112, and updates the channel priority information present in the storage module 112 so that the highest priority channel can be changed (216). Thereafter, the method returns to operation 202 or 208.

When a channel change command is received from a user via the input module 110 (218), the main tuner 102 tunes to a desired channel that the user wishes to tune to and receives a digital broadcast signal from the desired channel (202).

When the main tuner 102 receives a digital broadcast signal from the desired channel, the control module 116 extracts a video frame from the storage module 112 (222) and controls the decoder 108 to decode the extracted video frame (224). Thereafter, the control module 116 adjusts the output timing of the decoded video frame (226), and outputs the decoded video frame according to the result of the adjustment (242).

If a video frame extracted from the digital broadcast signal received by the main tuner 102 is an intra-frame (228), the control module 116 decodes the intra-frame (230), and outputs the decoded intra-frame (242). In contrast, if the video frame extracted from the digital broadcast signal received by the main tuner 102 is an inter-frame (228), the control module 116 designates a video frame present in the storage module 112 as a reference frame of the inter-frame (232). Then, the control module 116 decodes the inter-frame using the video frame designated as the reference frame of the inter-frame (234). An error, if any, present in the decoded inter-frame may be corrected using an error-concealment method. If the degree of degradation of the picture quality of the corrected inter-frame is higher than a predefined reference level (236), the corrected inter-frame may be skipped (238). In contrast, if the degree of degradation of the picture quality of the corrected inter-frame is lower than the predefined reference level (236), the picture-quality-improvement module 114 improves the picture quality of the corrected inter-frame (240), and the output module 110 outputs the result of the improvement performed by the picture-quality-improvement module 114.

The output of digital broadcast frames to which the present invention is applied will hereinafter be described in detail with reference to FIGS. 3 through 8.

A GOP of a typical digital broadcast signal may include 15 or 16 frames. According to an embodiment of the present invention, a frame transition may be performed in units of inter-frames. Therefore, it is possible to change channels within a relatively short period of time and thus to reduce user inconvenience.

Figure 3:
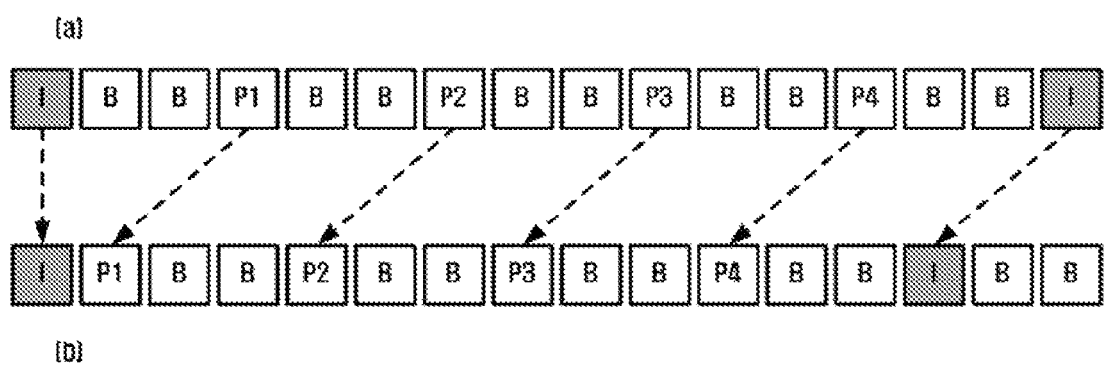
FIGS. 3 through 8 illustrate examples of an output of a group of video frames of a digital broadcast signal to which the present invention is applied.

In FIG. 3, (a) illustrates the order of output of typical digital broadcast frames. In reality, however, digital broadcast frames may be output in the order illustrated in (b) because P-frames can only be decoded with reference to I-frames and B-frames can only be decoded with reference to I- and P-frames.

FIGS. 4 through 8 illustrate the situations when a channel change command is received from a user when the auxiliary tuner 104 sequentially tunes to a plurality of channels. Specifically, FIGS. 4 through 8 illustrate the situations when the auxiliary tuner 104 tunes to a number of channels and stores a number of video frames respectively obtained from the channels in the storage module 112. Referring to FIGS. 4 through 8, assume that I-frames and P-frames are video frames stored in the storage module 112.

Reference character X indicates a discontinuity between video frames which is caused when the auxiliary tuner 104 sequentially tunes to a plurality of channels. That is, reference character X indicates the situation when a digital broadcast receiver fails to receive a video frame. The present embodiment will hereinafter be described in detail focusing mainly on a P-frame-based scenario.

Figure 4:
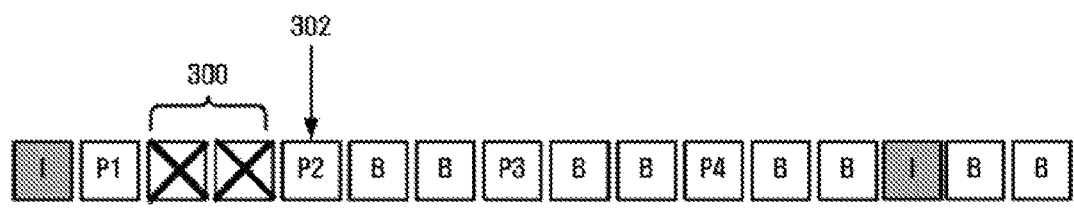

Referring to FIG. 4, reference numeral 300 indicates video frames which have not yet been received, and reference numeral 302 indicates the time when a user issues a channel change command. In this case, a P2 frame can be decoded using one or more video frame present in the storage module 112, i.e., an I-frame and a P1 frame. Therefore, a plurality of video frames are output to the output module 110 in the order of I, P1, P2, . . . while decoding the P2 frame and a number of video frames that follow the P2 frame.

Figure 5:
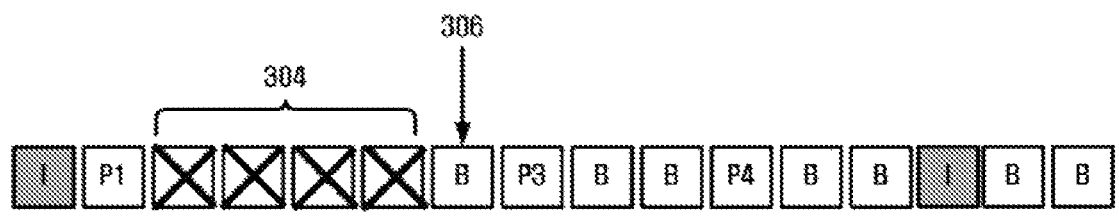

Referring to FIG. 5, reference numeral 304 indicates video frames which have not yet been received, and reference numeral 306 indicates the time when a user issues a channel-change command. Since I and P1 frames have already been stored in the storage module 112, and data is displayed in units of P-frames, data of a B-frame corresponding to the time 306 is abandoned, and a P3 frame is received. The P3 frame is an inter frame and thus requires a reference frame in order to be decoded. The P3 frame may be decoded using the I and P1 frames as reference frames. A frame error or degradation that may occur during the decoding of the P3 frame may be corrected using an error-concealment method. Then, a plurality of video frames are output in the order of I, P1, P3, . . . A frame error or degradation may occur during the decoding of the P3 frame may be corrected to a degree that does not cause much discomfort to the user by using an error-concealment method.

Figure 6:
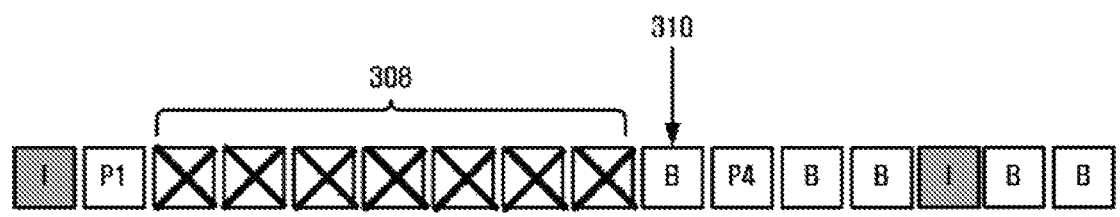
Figure 7:
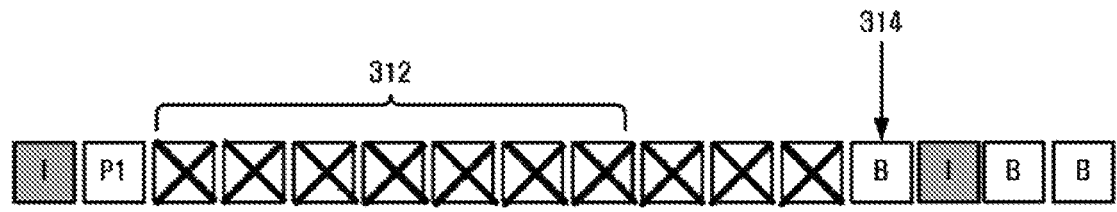

Referring to FIG. 6, reference numeral 308 indicates video frames which have not yet been received, and reference numeral 310 indicates the time when a user issues a channel-change command. Referring to FIG. 7, reference numeral 312 indicates video frames which have not yet been received, and reference numeral 314 indicates the time when a user issues a channel change command. Referring to FIGS. 6 and 7, it is expected that a next I-frame will be received shortly. Thus, the output of video frames with no frame error or degradation may be postponed until the next I-frame is received.

Figure 8:
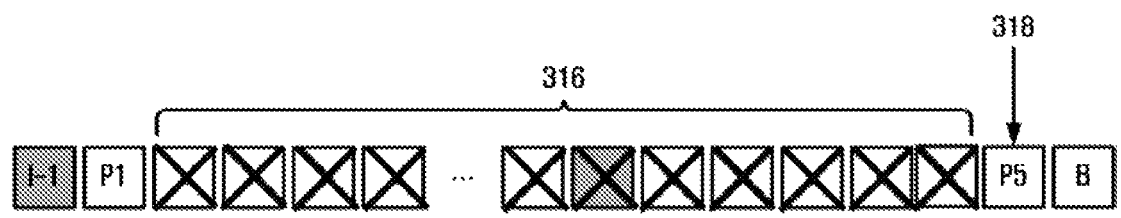

Referring to FIG. 8, reference numeral 316 indicates video frames which have not yet been received, and reference numeral 318 indicates the time when a user issues a channel-change command. FIG. 8 illustrates how to handle a discontinuity of digital broadcast data across the boundary between a pair of adjacent GOPs in response to a channel change command issued by a user, whereas FIGS. 4 through 7 illustrate how to handle a discontinuity of digital broadcast data within a GOP in response to a channel change command issued by a user. Referring to FIG. 8, a P5 frame corresponding to the time 318 is decoded using frames of a previous GOP as reference frames, and a frame error or degradation that may occur during the decoding of the P5 frame may be corrected using an error-concealment method.

The present invention can be used to reduce channel-change latency when data loss occurs during a digital airwave broadcast reception, during a digital cable broadcast reception that involves the use of a digital decoder, during an internet broadcast reception, or during an Internet Protocol Television (IPTV) broadcast reception.

Although the present invention has been described in connection with the exemplary embodiments of the present invention with reference to the accompanying drawings, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A method of outputting video frames while changing channels using a digital broadcast receiver, the method comprising:
 sequentially tuning to a plurality of channels and receiving a plurality of digital broadcast signals from the respective channels;
 extracting a plurality of video frames from the respective digital broadcast signals and storing the video frames;
 receiving a digital broadcast signal from a desired channel to be tuned upon receiving a channel change command;
 outputting at least one of the stored video frames before a digital broadcast signal of the desired channel is output;
 determining whether a video frame extracted from the digital broadcast signal of the desired channel is an intra-frame or an inter-frame;
 if it is determined that the extracted video frame is an intra-frame, decoding the intra-frame without reference to the stored video frames and outputting the decoded intra-frame;
 if it is determined that the extracted video frame is an inter-frame, decoding the inter-frame without converting the inter-frame into an intra-frame, detecting an error of the decoded inter-frame, and correcting the detected error by performing an error-concealment operation; and
 skipping outputting the decoded inter-frame if a degree of picture-quality degradation of the decoded inter-frame caused by the error-concealment operation is higher than a reference level.

2. The method of claim 1, further comprising storing channel priority information regarding the channels, wherein the sequentially tuning comprises sequentially tuning to the channels according to the channel priority information.

3. The method of claim 1, wherein the outputting the at least one of the stored video frames comprises adjusting a number of frames to be output per unit time, and outputting at least one of the stored video frames according to the result of the adjusting.

4. The method of claim 1, wherein the outputting the at least one of the stored video frames comprises restoring an image by decoding at least one of the stored video frames, and outputting the restored image.

5. The method of claim 3, wherein the adjusting the number of frames to be output per unit time comprises adjusting the number of frames per unit time so as to approximately coincide with an output timing of the digital broadcast signal of the desired channel.

6. The method of claim 1, wherein the decoding the inter-frame comprises, if it is determined that the video frame extracted from the digital broadcast signal of the desired channel is an inter-frame, designating at least one of the stored video frames as a reference frame of the inter-frame, decoding the inter-frame using the at least one of the stored video frames designated as the reference frame of the inter-frame, and outputting the decoded inter-frame.

7. The method of claim 6, further comprising applying a filter for improving the quality of pictures to the decoded inter-frame if a degree of picture quality degradation caused by the error-concealment operation is lower than the reference level.

8. The method of claim 7, wherein the applying the picture-quality-improvement filter comprises applying a deblocking filter for compensating for block loss to the decoded inter-frame.

9. An apparatus for outputting video frames while changing channels using a digital broadcast receiver, the apparatus comprising:
 a main tuner which receives a digital broadcast signal from a desired channel to be tuned;
 at least one auxiliary tuner which sequentially tunes to a plurality of channels and receive a plurality of digital broadcast signals from the respective channels;
 a storage which stores a plurality of video frames extracted from the respective digital broadcast signals; and
 a processor configured to execute a control module which controls the main tuner to receive the digital broadcast signal of the desired channel upon receiving a channel change command, and outputs at least one of the video frames present in the storage module before the digital broadcast signal of the desired channel is output,
 wherein the control module determines whether a video frame extracted from the digital broadcast signal of the desired channel is an inter-frame or an intra-frame, and, if it is determined that the extracted video frame is an intra-frame, controls the intra-frame to decoded without reference to the stored video frames, and the decoded intra-frame to be output,
 wherein if it is determined that the extracted video frame is an inter-frame, the control module controls the inter-frame to be decoded without converting the inter-frame into an intra-frame, detects an error of the decoded inter-frame, and corrects the detected error by performing an error-concealment operation, and
 wherein the control module skips outputting the decoded inter-frame if a degree of picture quality degradation of the decoded inter-frame caused by the error-concealment operation is higher than a reference level.

10. The apparatus of claim 9, wherein:
 the storage module stores channel priority information regarding the channels; and
 the control module controls the auxiliary tuners to sequentially tune to the channels according to the channel priority information.

11. The apparatus of claim 9, wherein the control module adjusts a number of frames to be output per unit time, and outputs at least one of the stored video frames according to a result of the adjustment.

12. The apparatus of claim 9, further comprising a decoder which restores an image by decoding at least one of the stored video frames, wherein the control module controls the decoder to decode at least one of the stored video frames to thereby restore an image, and to then output the restored image.

13. The apparatus of claim 11, wherein the control module adjusts the number of frames to be output per unit time so as to approximately coincide with an output timing of the digital broadcast signal of the desired channel.

14. The apparatus of claim 9, wherein if it is determined that the video frame extracted from the digital broadcast signal of the desired channel is an inter-frame, the control module designates at least one of the stored video frames as a reference frame of the inter-frame, controls the inter-frame to be decoded using the at least one of the stored video frames designated as the reference frame of the inter-frame, and the decoded inter-frame to be output to the user.

15. The apparatus of claim 14, wherein the control module applies a filter for improving the quality of pictures to the decoded inter-frame, if a degree of picture quality degradation caused by the error-concealment operation is lower than the reference level.

16. The apparatus of claim 15, wherein the filter comprises a deblocking filter for compensating for block loss.

* * * * *